United States Patent
St. Pierre

(10) Patent No.: US 12,348,557 B2
(45) Date of Patent: Jul. 1, 2025

(54) SLOWING REQUESTS FROM MALICIOUS NETWORK CLIENTS USING A TARPITTING TECHNIQUE

(71) Applicant: Arbor Networks, Inc., Westford, MA (US)

(72) Inventor: Brian St. Pierre, Acworth, NH (US)

(73) Assignee: ARBOR NETWORKS, INC., Westford, MA (US)

( * ) Notice: Subject to any disclaimer, the term of this patent is extended or adjusted under 35 U.S.C. 154(b) by 644 days.

(21) Appl. No.: 17/807,636

(22) Filed: Jun. 17, 2022

(65) Prior Publication Data

US 2023/0231874 A1   Jul. 20, 2023

Related U.S. Application Data

(60) Provisional application No. 63/300,884, filed on Jan. 19, 2022.

(51) Int. Cl.
*H04L 9/40* (2022.01)
*H04L 61/4511* (2022.01)
*H04L 67/145* (2022.01)

(52) U.S. Cl.
CPC ...... *H04L 63/1458* (2013.01); *H04L 61/4511* (2022.05); *H04L 63/1416* (2013.01); *H04L 63/1425* (2013.01); *H04L 63/1441* (2013.01); *H04L 67/145* (2013.01)

(58) Field of Classification Search
None
See application file for complete search history.

(56) References Cited

U.S. PATENT DOCUMENTS

| 8,613,089 | B1 | 12/2013 | Holloway et al. |
| 8,800,039 | B2 | 8/2014 | Yoon |
| 2007/0220600 | A1* | 9/2007 | de Graaf ............ H04L 63/1441 726/22 |
| 2012/0216282 | A1 | 8/2012 | Pappu et al. |
| 2018/0302438 | A1 | 10/2018 | Robertson |
| 2020/0137021 | A1 | 4/2020 | Janakiraman |
| 2021/0168173 | A1* | 6/2021 | Compton ............ H04L 63/145 |

OTHER PUBLICATIONS

Shing, ("Shing." An improved tarpitfor network deception (Doctoral dissertation, Monterey, California: Naval Postgraduate School, 2016) (Year: 2016).*

(Continued)

*Primary Examiner* — Luu T Pham
*Assistant Examiner* — Edward X Long
(74) *Attorney, Agent, or Firm* — Foley & Lardner LLP

(57) ABSTRACT

A method of monitoring a network during a DDoS attack is provided. The method includes receiving packets included in the attack, determining whether the packets are designated for tarpitting, for each packet from a source determined to be designated for tarpitting, assigning the packet to an existing or newly established flow, applying at least one tarpitting technique, and applying a randomization function for adjusting the at least one tarpitting technique or for selecting the at least one tarpitting technique to be applied from a plurality of candidate tarpitting techniques.

16 Claims, 12 Drawing Sheets

(56) References Cited

OTHER PUBLICATIONS

Abubakar, R., Aldegheishem, A., Majeed, M.F., Mehmood, A., Maryam, H., Alrajeh, N.A., Maple, C. and Jawad, M., 2020. An effective mechanism to mitigate real-time DDoS attack. IEEE Access, 8, pp. 126215-126227. (Year: 2020).*

Walla, S. and Rossow, C., Jun. 2019. Malpity: Automatic identification and exploitation of tarpitvulnerabilities in malware. In 2019 IEEE European Symposium on Security and Privacy (EuroS&P) (pp. 590-605). IEEE. (Year: 2019).*

* cited by examiner

Timer-Based Queue Processing

SLOWING REQUESTS FROM MALICIOUS NETWORK CLIENTS USING A TARPITTING TECHNIQUE

CROSS REFERENCE TO RELATED APPLICATIONS

This application claims priority to U.S. Patent Application Ser. No. 63/300,884 filed Jan. 19, 2022, which is incorporated herein by reference in its entirety.

BACKGROUND

1. Field of the Disclosure

The present disclosure relates to network security, and more particularly, to a system and method for using a tarpitting technique to formulate one or more responses that reduce the rate of requests from malicious network clients.

2. Description of Related Art

Application layer distributed denial of service (DDoS) attacks (also referred to as application attacks) utilize valid requests, often from non-spoofed IP addresses to attack an application itself, focusing on specific vulnerabilities or issues of the application. The requests are designed to consume resources on the target system, making it so that the target system becomes degraded or unusable by legitimate users. Once detected, an attack can be mitigated by preventing packets from an attack to its target by dropping the packets. However, this technique may signal the attacker that the attack has been detected and is no longer working, causing the attacker to either change the attack technique, switch to a different source, or otherwise avoid dropping of the packets from the attack. A more naive attacker may simply continue to resend requests that were dropped, thus consuming bandwidth of a device performing the mitigation.

Application attacks need to be performed by intelligent devices that have the ability to conform to a protocol of an application being attacked, which can include conforming to protocol handshakes and protocol/application compliance. With the proliferation of insecure internet-of-things (IoT) devices in recent years that have such capabilities, there is risk of an increase in application attacks.

While conventional methods and systems have generally been considered satisfactory for their intended purpose, there is still a need in the art for a method of thwarting application attacks without alerting the attacker.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, disclosed is a method of monitoring a network during a DDoS attack. The method includes receiving packets included in the attack, determining whether the packets are designated for tarpitting, for each packet from a source determined to be designated for tarpitting, assigning the packet to an existing or newly established flow, applying at least one tarpitting technique, and applying a randomization function for adjusting the at least one tarpitting technique or for selecting the at least one tarpitting technique to be applied from a plurality of candidate tarpitting techniques.

In one or more embodiments, the method can further include, for each newly established flow, establishing a flow record, wherein the flow record can store one or more parameters that affect timing and/or content of a transmission and/or a future transmission related to the flow, and wherein applying the at least one tarpitting technique can include adjusting at least one of the parameters stored with the flow record.

In one or more embodiments, applying the at least one tarpitting technique can include at least one of transmitting the transmission, enqueuing the transmission, and modifying one or more fields of the flow record for the future transmission, and updating counters and/or statistics that affect the future transmission.

In one or more embodiments, the one or more parameters can include a timestamp value, wherein the timestamp value can indicate a time when the transmission or the future transmission should be sent.

In one or more embodiments, sending of the transmission or the future transmission can be caused to be performed in response to a timer having a time that matches the timestamp value or receipt of a packet of the flow.

In one or more embodiments, adjustment of the parameter can cause delay of the transmission when sent in response to receipt of a packet, wherein the parameter can be adjusted for the delay to be less than a value that would trigger a client timeout.

In one or more embodiments, the flow record can include a protocol indicator indicative of a protocol used by the flow, and the candidate tarpitting techniques can be selected from a catalogue of multiple tarpitting techniques, each of the multiple tarpitting techniques having a protocol mask indicative of a protocol to which the tarpitting technique is suitable to be applied, wherein the candidate tarpitting techniques selected from the catalogue can each have a protocol indicator that matches the protocol mask of the flow record.

In one or more embodiments, wherein the at least one tarpitting technique can include one or more of the following tarpitting technique sets:
  A. responding to the received packet with a response that is delayed by a selected delay interval;
  B. responding to the received packet with a selected error message;
  C. responding to the received packet with a malformed response in which a portion of a proper response is omitted, corrupted or has been added to;
  D. wherein when a packet of the packets received uses transmission control protocol (TCP):
    responding to the received packet with numerous responses each having a small portion of the full response;
    responding to the received packet with a message having a bad TCP checksum;
    setting a TCP window size to a selected small value; and/or
    responding to the received packet with a message that does not include acknowledgement data;
  E. wherein when a packet of the packets received uses domain name system (DNS) and the received packet is a query that uses user datagram protocol (UDP), responding to the received packet with a truncated response;

F. wherein when a packet of the packets received uses a protocol with an authorization component, responding to the received packet with a message that authorization is required or failed;
G. wherein when a packet of the packets received uses hypertext transport protocol (HTTP):
   responding to the received packet with an error code or a success code and a page body with a relatively large content-length;
   responding to the received packet with an error code or a success code and a page body without a content-length header such that such page is of an indefinite size; and/or
   responding to the received packet with a page body containing a link to a JavaScript resource, wherein the JavaScript resource uses one or more available tarpitting techniques;
H. wherein when a packet of the packets received uses DNS, responding to the received packet with a delegation response chain or a CNAME response chain to a name server address that is null-routed; and
I. wherein when a packet of the packets received uses a protocol that supports a redirection feature, responding to the received packet with an application redirection for redirecting the client into a tarpit.

In one or more embodiments, the randomization function can adjust the at least one tarpitting technique, including at least one of:
   for tarpitting technique set A, setting a length of the selected delay interval based on a value determined by the randomization function;
   for tarpitting technique set B, selecting the error message from a plurality of candidate error messages using the randomization function;
   for tarpitting technique set C, wherein the randomization function is used to determine at least one of:
      which type of malformed response of a plurality of candidate types of malformed responses is used as the malformed response;
      which field of a plurality of candidate fields in the malformed response to deform, add, or omit;
      a portion of the field determined to be malformed;
      a type of deformation to apply to the response;
      an amount of malformed responses to transmit; and
      a value to include in the malformed response;
   for tarpitting technique set D, wherein the randomization function is used to determine at least one of a type of tarpitting techniques to apply, a division of the response into numerous responses, and/or the small value;
   for tarpitting technique set E, setting an amount of the response that is truncated based on a value determined by the randomization function;
   for tarpitting technique set F, whether to respond that the authorization is required or has failed is determined using the randomization function;
   for tarpitting technique set G, wherein the randomization function is used to determine at least one of a type of tarpitting techniques to apply, a size of the large content-length, whether to respond with an error or a success code is determined using the randomization function;
   for tarpitting technique set H, wherein a chain length for providing canonical names or delegation is selected using the randomization function, and/or wherein a selection of sending a CNAME response or a delegation response is made by applying a randomization process; and
   for tarpitting technique set I, wherein the randomization function is used to determine at least one of a redirection message or code, and/or a redirection location which may include a random value for the name and/or address of the location, and/or a random value for the TCP or UDP port of the location.

In one or more embodiments, wherein the method can further include observing behavior of the source based on a response from the source, content of the response from the source, and/or lack of response by the source to the at least one tarpitting technique used, and adjusting application of the randomization function based on the observed behavior.

In accordance with further aspects of the disclosure, a computer system is provided that performs the disclosed method. In accordance with still further aspects of the disclosure a non-transitory computer readable storage medium and one or more computer programs embedded therein is provided, which when executed by a computer system, cause the computer system to perform the disclosed method.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
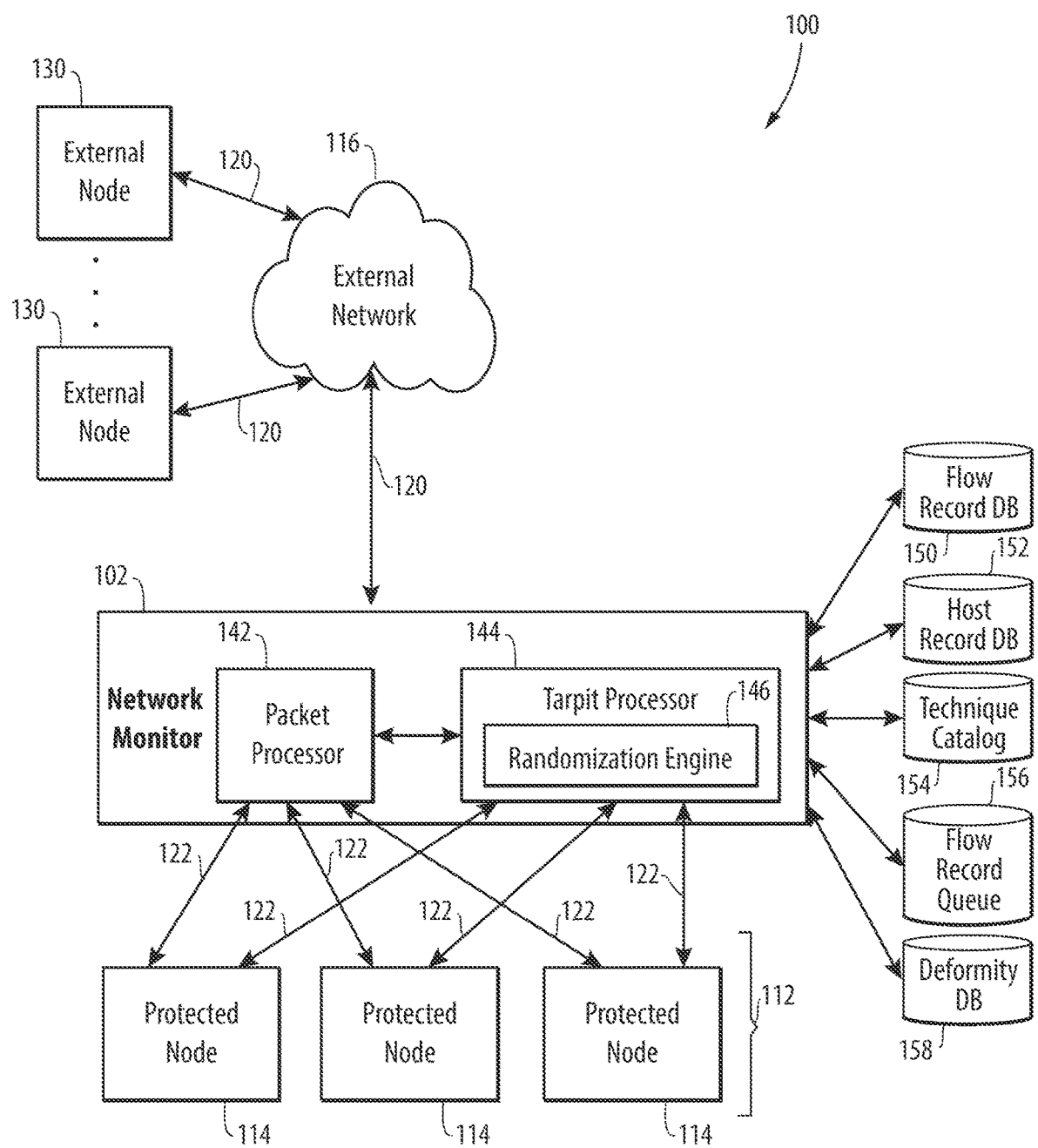
FIG. 1 illustrates a block diagram of an example network system having a network monitor with a tarpit processor, in accordance with an aspect of the disclosure.

Reference will now be made to the drawings wherein like reference numerals identify similar structural features or aspects of the subject disclosure. For purposes of explanation and illustration, and not limitation, a block diagram of an exemplary embodiment of a network system 100 in accordance with the disclosure is shown in FIG. 1 and is designated generally by reference character 100. Methods associated with slowing requests from malicious network clients during network communication associated with a protected network of the network system 100 in accordance with the disclosure, or aspects thereof, are provided in FIGS. 2-12, as will be described.

With reference now to FIG. 1, network system 100 includes a network monitor 102 that detects and mitigates attacks directed at a target in one or more protected networks 112, each protected network having one or more protected nodes 114. External nodes 130 can communicate with protected nodes 114 via an external network 116. Communication between one of the protected nodes 114 and one of the external nodes 130 can be in accordance with a client/server model, in which one of the protected node 114 and the external node 130 functions as a client that requests a service, and the other of the protected node 114 and the external node 130 functions as a server that responds to the client for providing the requested service.

Network monitor 102 monitors network traffic to and from protected nodes 114 of the one or more protected networks 112, such as for analyzing request traffic output by external nodes 130 to protected nodes 114. The network monitor 102 includes or accesses a packet processor 142, a tarpit processor 144, a flow record database (DB) 150, a host record DB 152, a technique catalog 154, and a flow record queue 156.

Packet processor 142 is configured to process packets from external nodes 130, such as for detecting whether the packets are included in an application attack. When the packets are determined to be not included in an attack, the packet processor forwards the packets to protected network 112. However, when the packets are determined to be included in an attack, the packet processor forwards the packets to tarpit processor 144. The external node 130 that is a source of the packet determined to be included in the attack is referred to below as an attacker.

The objective of tarpit processor 144 is to leverage predictable behavior by the attacker in response to network failure or slowness by simulating network failure or slowness. When network failure or slowness is simulated, this can appear to the attacker as if the attack is working. The attacker can interpret the simulated network failure or slowness as failure by the target that was caused by the attack. Tarpitting techniques are used to simulate the network failure or slowness. These tarpitting techniques have a secondary effect of slowing down a rate of requests by the attacker. Further objectives include preventing the attacker from being able to resolve an IP address of its ultimate target(s), wherein the ultimate target is the computer handling the resolved IP address; and preventing the attacker from having the ability to flood a DNS server of a protected node 114 by redirecting the attacker in a way that causes the attacker to waste time without wasting any of the target server's or network's resources. For example, if it has been determined that the DNS request is from the attacker, the response to the DNS request can be an IP address controlled by the tarpit processor 144 instead of the IP address that would normally be resolved. In another example, the response can include tarpitting errors.

Most application-layer protocols (e.g. hypertext transfer protocol (HTTP), session initiation protocol (SIP)) rely on domain name system (DNS) servers to convert human-friendly hostnames (e.g., www.example.com) into machine-friendly internet protocol (IP) addresses (e.g., 198.51.100.42). If an attacker wants to target a webserver serving a website the attacker is likely to perform a DNS request to get the IP address.

Based on this reliance of application-layer protocols on DNS, tarpit processor 144 uses one or more tarpitting strategies. The tarpitting strategies can be used individually, combined, and/or parameters can be adjusted. Tarpit processor 144 includes or accesses a randomization engine 146 that can randomize selection of tarpitting strategies and/or which parameters are adjusted or the settings to which the parameters are adjusted.

For each connection, tarpit processor 144 creates a flow record. Each connection identifies a connection between a source and a destination, e.g., the 5-tuple (source IP address, destination IP address, layer 4 protocol, source port, destination port), that is tarpitted by tarpit processor 144. All of the flow records are stored in a data structure, such as flow record DB 150.

One tarpitting technique causes transmission delays. Each flow record is provided with a timestamp field that is used to introduce a transmission delays, flow records contain an additional field that has a timestamp indicating when another packet should be sent as a response to the external node 130. Pointers to flow records that have this timestamp set are sorted by the timestamp and saved in flow record queue 156. A flow record can have multiple timestamps for staggering transmission of the same packet at multiple different times, such that multiple pointers for the same flow record can be added to flow record queue 156. A timer signal fires periodically, which triggers the tarpit processor 144 to check flow record queue 156. Any flow records having a timestamp equal to the current time or older are processed and removed from flow record queue 156 for transmission to external nodes 130.

Figure 12:
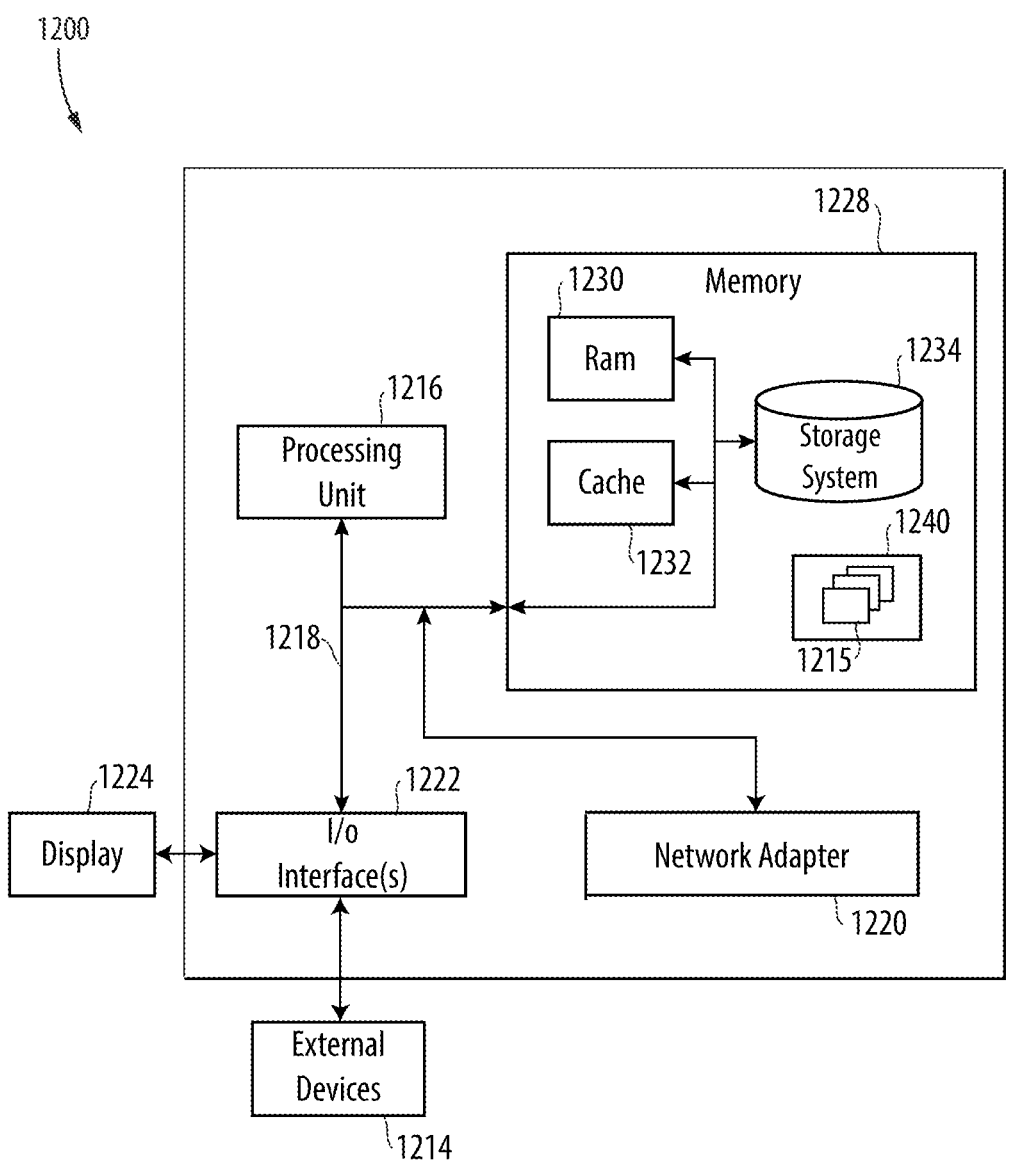
FIG. 12 illustrates an example computing system that could be used to implement a network monitor, as shown in FIG. 1, in accordance with an embodiment of the disclosure.

With reference to architecture of network monitor 102 and its related storage, network monitor 102 includes a central processing unit (CPU), random access memory (RAM), and a storage medium, which can be connected through buses and used to further support the processing of the received packets, as shown and described with respect to FIG. 12. Programmable instructions can be stored in the storage medium and executed by the CPU to cause the CPU to perform operations described herein. Network monitor 102 can be implemented as physical or virtual devices. Whether implemented as physical or virtual device(s), network monitor 102 uses a local or remote hardware processing device that executes software instructions, which enables performance of the disclosed functions.

Each of packet processor 142 and tarpit processor 144 can be accessible by network monitor 102, and can be integrated with or external from network monitor 102. In addition, each of packet processor 142 and tarpit processor 144 can be implemented using software, hardware, and/or firmware. Packet processor 142 and tarpit processor 144 can be configured as different processes and/or as distinct computing devices, or packet processor 142 and tarpit processor 144 can be a single process or executed on a single computer. Functionality and/or components packet processor 142 and tarpit processor 144 can be shared or divided amongst packet processor 142 and tarpit processor 144 in a variety of ways.

Protected network 112 can include one or more networks, such as an intranet, a local area network (LAN), and/or a wide area network (WAN). In examples, protected network 112 can be an enterprise network, such as a school network, business network, and government network, to list a few examples, that can connect to the Internet. The external network 116 can include one or more WANs, e.g., the Internet, which may be used to access protected network 112.

In embodiments, at least portions of the network monitor 102 are located between the external network 116 and the protected network 112. In other embodiments, at least portions of the network monitor 102 are located within the external network 116 or protected network 112. At least portions of the network monitor 102 can be located at a network edge (inside or outside of the protected network 112) or deeper within the protected network 112.

In the example shown, one protected network 112 is shown, however one skilled in the art will recognize that the network monitor 102 can provide a protection service to multiple protected networks 112. Similarly, the number of protected nodes 114 per protected network is not limited to a particular number.

Packet processor 142 of network monitor 102 includes or communicates with hardware, firmware, and/or software components that are configured to observe content of packets included in network traffic. Packet processor 142 can include central or distributed elements for observing, intercepting, and/or analyzing network data. These elements can be passive or active and include software, firmware, and/or hardware components, such as taps, probes, or port mirrors. These elements can be positioned inline, and/or remote relative to communication links 120 and 122.

Each of protected nodes 114 and external nodes 130 can be a computing device such as a server, laptop device, network element (such as routers, switches, and firewalls), embedded computer device that is embedded in other devices, such as appliances, tools, vehicles, or consumer electronics, mobile devices, such as laptops, smartphones, cell phones, and tablets. The protected nodes 114 and external nodes 130 can each operate as a client or as a server in a client/server exchange that uses a client-server protocol. The disclosure is directed to scenarios in which an external node 130 operates as a client and submits a request (such as a DNS request and/or request using a protocol, such as TCP, HTTP, internet control message protocol (ICMP), SIP, and/or user datagram protocol (UDP)) to a protected node 114 that is operating as a server.

Each of flow record DB 150, host record DB 152, technique catalog 154, flow record queue 156, and deformity DB 158 can store data structures used by network monitor 102. The data structures can be stored in memory or on persistent storage (such as a file system) that is integrated with network monitor 102, or in a database system that is external to network monitor 102. For example, flow record DB 150, host record DB 152, technique catalog 154, flow record queue 156, and deformity DB 158 can be stored in a storage device that includes computer system readable media in the form of volatile or non/volatile memory or storage media, such as random access memory (RAM), cache memory, a magnetic disk, an optical disk, etc. The storage device can be accessible by network monitor 102, and can be integrated with or external from network monitor 102.

Network traffic can flow via communications links 120, 122, and 124. In the example shown, network traffic flows to and from external network 116 via wired and/or wireless communication links 120, network traffic flows between network monitor 102 and the protected nodes 114 of the protected network(s) 112 via wired and/or wireless communication links 122, and network traffic flows between tarpit processor 144 and the external network 116 via wired and/or wireless communication link 124.

With reference now to FIGS. 2-4 and 7-11, shown are flowcharts and flow diagrams demonstrating implementation of the various exemplary embodiments. It is noted that the order of operations shown in FIGS. 2-4 and 7-11 is not required, so in principle, the various operations may be performed out of the illustrated order. Also certain operations may be skipped, different operations may be added or substituted, some operations may be performed in parallel instead of strictly sequentially, or selected operations or groups of operations may be performed in a separate application following the embodiments described herein.

Language that refers to the transfer of information is not meant to be limiting. For example, the term "receive" as used herein refers to obtaining, getting, accessing, retrieving, reading, or getting a transmission. Use of any of these terms is not meant to exclude the other terms. Data that is transferred to or from a module can be transferred by a transmission to or from the module, or can include the data in a location that can be accessed by the module or is provided in a manner to be accessible to another module.

Figure 2:
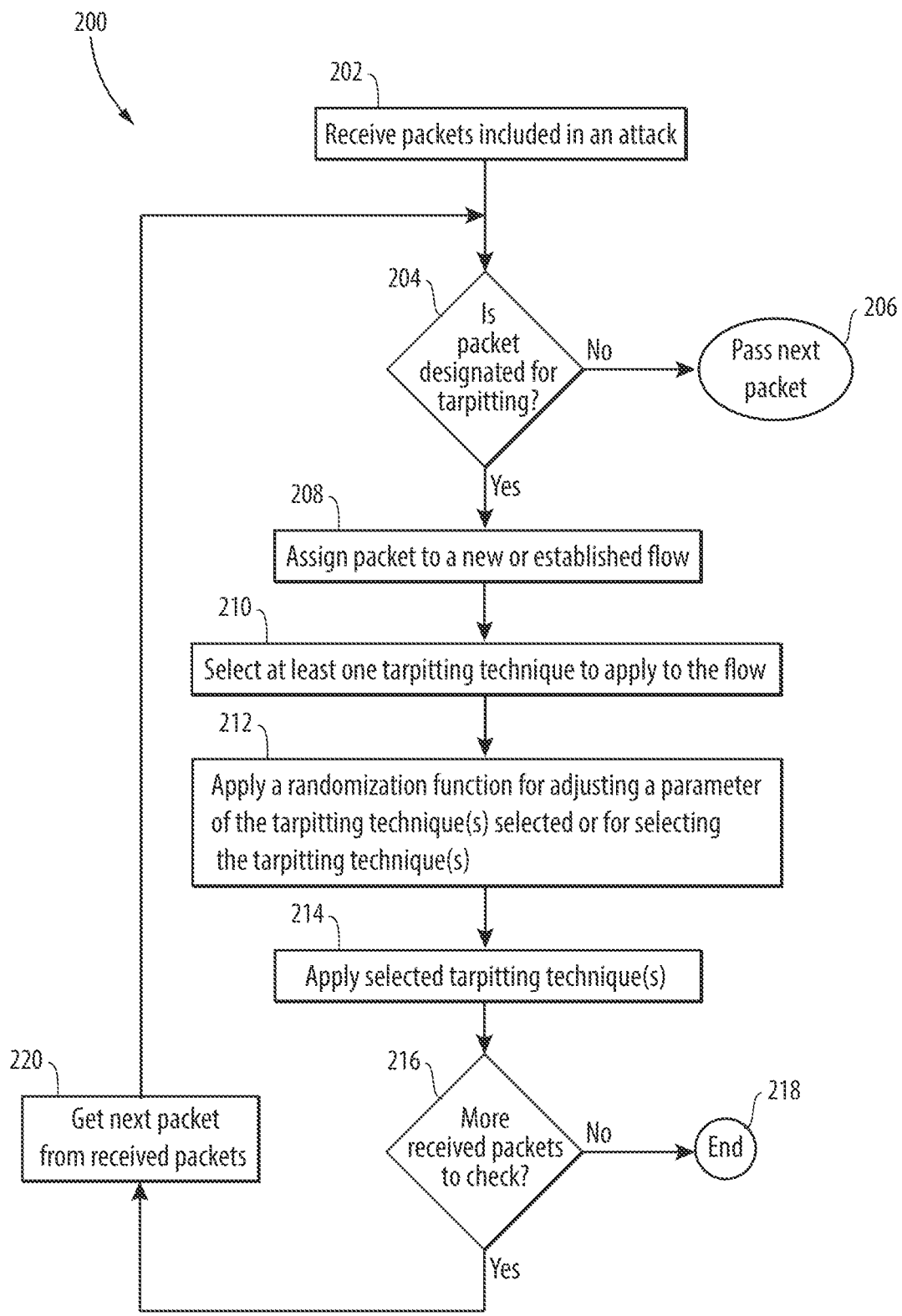
FIG. 2 illustrates a flowchart showing an example method of processing packets by the tarpit processor, in accordance with one or more embodiments of the disclosure.

FIG. 2 shows a flowchart 200 of example operations performed by a network monitor, such as packet processor 142 and/or tarpit processor 144 of network monitor 102 shown in FIG. 1, for processing packets. In the example shown, packet processor 142 handles blocks 202-206 and 216-220, and tarpit processor 144 handles blocks 208-214. However, it is understood that performance of blocks 202-220 can be divided among packet processor 142 and tarpit processor 144 in a variety of ways. At block 202, packets known to be included in an attack are received. These packets can be malicious requests from a source that is mounting the attack. At decision block 204, a determination is made (e.g., considering the received packets one at a time) whether the received packet is designated for tarpitting. This can be performed, for example, by checking the source IP address of the packet against a tarpit list. The tarpit list can be stored as a data structure in memory or persistent storage (such as a file system) of the network monitor or in a database system that is external to the network monitor. The tarpit list can be implemented, for example and without limitation, as a lookup table (LUT) or as an access control list (ACL) with an action for the source IP address set to tarpit (e.g., by the tarpit processor).

If the determination at block 204 is NO, meaning the packet's source IP address is not included on the tarpit list, then the method continues at block 206, at which the packet is passed to a protected network being protected by the network monitor, such as protected network 112 shown in FIG. 1. If the determination at block 204 is YES, meaning the packet's source IP address is included on the tarpit list, then the method continues at block 208, at which the packet is processed by the tarpit processor.

At block 208, the tarpit processor consults a collection of flow records (e.g., a database), such as flow record DB 150 shown in FIG. 1, and a determination is made whether a flow record exists for the packet. The flow records in the flow record DB can be identified by source and destination IP addresses and port addresses. If it is determined that the packet has source and destination IP addresses and port addresses that match a flow record in the flow record DB, the matching flow record is retrieved. If the there is no flow record in the flow record DB that matches the packet's source and destination IP addresses and port addresses, a flow record is created for the packet (with the source and destination IP addresses and ports of the packet) and added to the flow record DB.

The method then continues at block 210 for processing the flow assigned to the flow record that was retrieved or created. At block 210, at least one tarpitting technique is selected to apply to the flow. The tarpitting technique can include responding to the malicious request with a reply that causes the source to slow down its attack of malicious requests. At block 212, a randomization function is applied for either adjusting a parameter of the selected tarpitting technique, or for selecting the tarpitting technique in block 210. Blocks 212 and 210 can be combined and/or performed in reverse order. At block 214, the selected tarpitting technique is applied. At decision block 216, a determination is made whether there are additional received packets to check. If the determination at decision block 216 is YES, meaning that there are more received packets to check, the method continues at block 220 for retrieving a next packet of the received packets. If the determination at decision block 216 is NO, meaning that there are no further received packets to check, the method ends at block 218.

Figure 3:
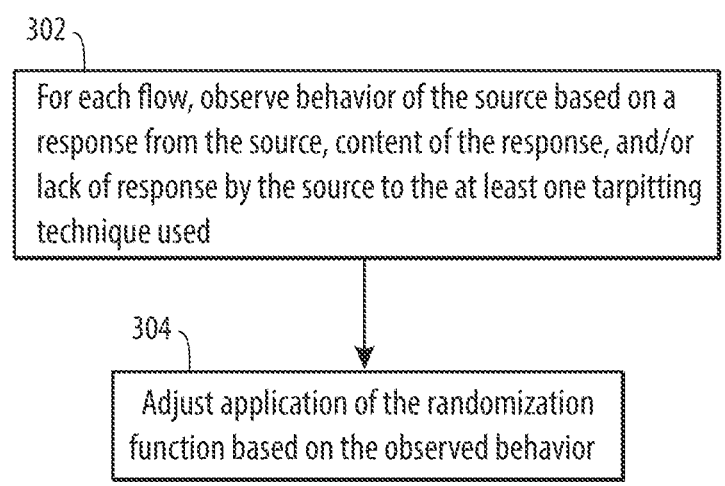
FIG. 3 illustrates a flowchart showing a further example method of processing packets by the tarpit processor, in accordance with one or more embodiments of the disclosure.

FIG. 3 shows a flowchart 300 of example operations that can be performed by a tarpit processor, such as tarpit processor 144 shown in FIG. 1, in accordance with one or more embodiments of the disclosure. At block 302, for each flow, behavior of the source is observed based on how the source responds to the replies sent to the source when implementing the selected tarpitting technique(s). The behavior observed can include responses from the source (e.g., timing and quantity of these responses) to the replies sent to the source when implementing the selected tarpitting technique(s), content of the response(s) from the source, and/or lack of response by the source. At block 304, application of the randomization function is adjusted based on the observed behavior. For example, if the source retries a request when the response is delayed less than a certain threshold, but fails to retry when the randomization function selects a higher delay interval, the randomization function is restricted to selecting values below that observed maximum practical delay. As another example, if a particular source is known to have sent excessive amounts of packets (based on Total bytes sent 606 and/or Total datagrams received 608), the randomization function could be adjusted to only return longer delay intervals.

Figure 4:
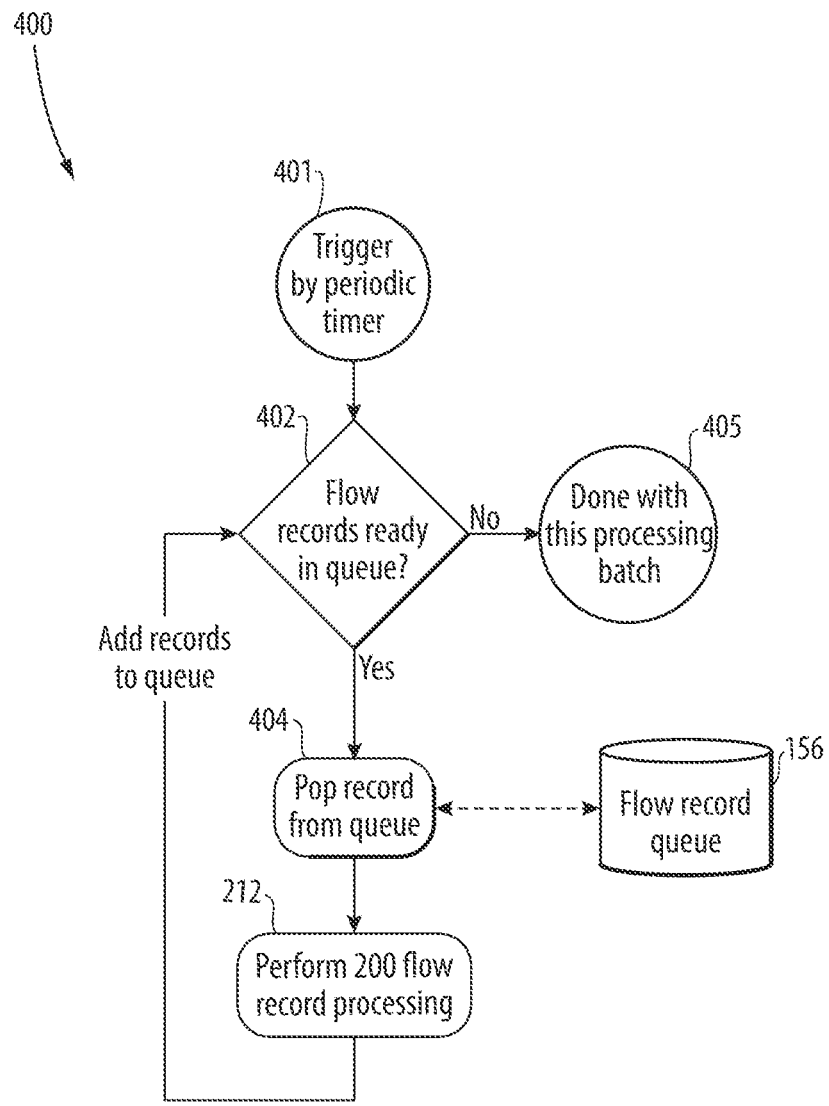
FIG. 4 illustrates a flowchart showing an example method of queue processing, in accordance with one or more embodiments of the disclosure.

FIG. 4 shows a flowchart 400 of example operations performed by a tarpit processor, such as tarpit processor 144 of network monitor 102 shown in FIG. 1, for processing packets. At block 401, the initiation of the method is triggered periodically by a periodic timer. At block decision 402, a determination is made whether any flow records are ready in a flow record queue, such as flow record queue 156 shown in FIG. 1. A flow record is considered to be ready when it has a timestamp equal to or older than the current time. If the determination at block 402 is NO, meaning there are no flow records ready in the flow record queue, then the method of processing the flow record queue ends at block 405. If the determination at block 402 is YES, meaning there are flow records ready in the flow record queue, then the method continues at block 404. At block 404, the flow record is popped from the flow record queue. Next, block 212 is performed for processing the flow record that was popped, which is shown and described in greater detail with respect to FIG. 3.

The method continues to block 402. A loop of blocks 402, 404, and 212 are repeated until there are no further flow records ready in the flow record queue to be processed. It is noted that the flow record queue can be modified during performance of block 212, such as by adding the same record to the flow record queue for replacing the flow record as it was previously stored on the flow record queue with a later time stamp (e.g., for delaying a transmission of the corresponding packet) or for adding an additional instance of the flow record on the flow record queue (e.g., for multiple staggered transmissions of the corresponding packet).

Figures 5, 6:
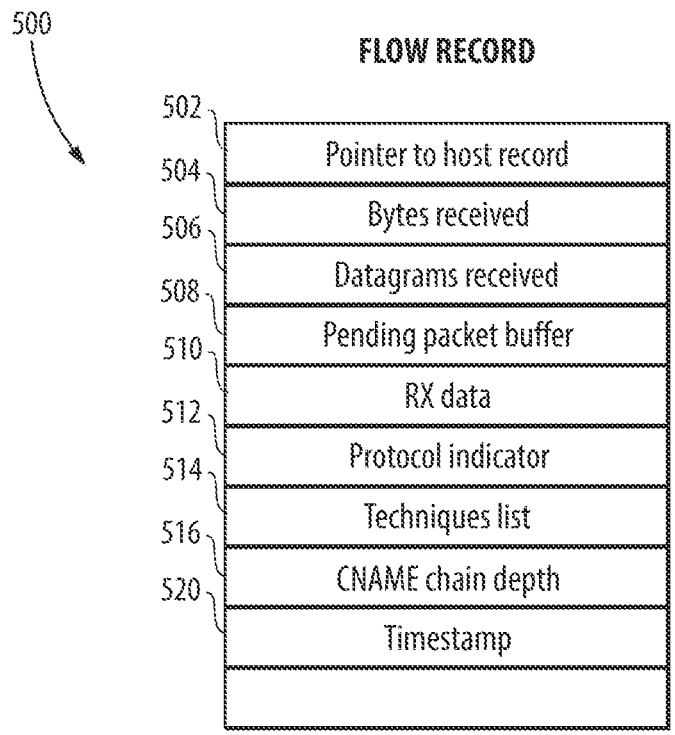
FIG. 5 illustrates an example flow record, in accordance with one or more embodiments of the disclosure.
FIG. 6 illustrates an example host record, in accordance with one or more embodiments of the disclosure.

FIG. 5 shows an example flow record 500 for a particular flow, wherein each flow has an associated flow record. The flow record 500 includes a number of fields, including: a pointer to host record field 502, a bytes received field 504, a datagrams received field 506 (which can be used for UDP applications and can be omitted for non-UDP applications), a pending packet buffer 508, an RX data field 510, a protocol indicator 512, a techniques list 514, a CNAME chain depth field 516 (which can be used for applications that use CNAME and can be omitted for applications that do not use CNAME), and a timestamp field 520.

Pointer to host record 502 stores a pointer that points to a host record 600 stored to include data about the external node 130 (shown in FIG. 1) that was a source of the packets received that belong to the flow record 500. Pending packet buffer 508 stores data that tarpit processor 144 is in the process of sending to a connection, for example as described above with reference to state 522. RX data field 510 stores data received about a connection, for example a DNS request.

Protocol indicator 512 includes a protocol used by the associated flow. Techniques list 514 stores a list of candidate tarpitting techniques that were selected from technique catalogue 154 (shown in FIG. 1). The candidate tarpitting techniques included in techniques list 514 are selected based on the protocol identified by protocol indicator 512 and a protocol mask or the equivalent associated with each technique included in technique catalogue 154. Technique catalogue 154 stores multiple tarpitting techniques, wherein each of the stored tarpitting techniques have a protocol mask indicative of one or more protocols to which the tarpitting technique is suitable to be applied. The candidate tarpitting techniques selected from technique catalogue 154 each have a protocol mask that matches the protocol indicator 512 of the flow record. When one or more tarpitting techniques are selected for implementation, they are selected from the candidate tarpitting techniques. In one or more embodiments, selection of the tarpitting technique(s) to be implemented can be randomized by using a randomization function.

CNAME chain depth field 516 indicates a chain depth for providing canonical names (CNAMEs) or redirections for the flow is used. This parameter can be preset or can be randomized using a randomization function.

With reference to FIG. 6, an example host record 600 is shown for a host that is an external node 130 (shown in FIG. 1) that has transmitted a request subjected to tarpitting by the tarpit processor 144 (shown in FIG. 1). Generally, host record 600 is used by network monitor 102 to store information gleaned about a host. The host record 600 includes a number of fields, including a total bytes received field 604 that indicates the total number of bytes sent by the host; the description of FIG. 3 provides examples of usage of this field. Datagrams received field 608 indicates the total number of datagrams sent by the host; the description of FIG. 3 provides examples of usage of this field.

Host handles DNS truncate field 614 can hold the values of (yes, no, unknown) to track whether the host has responded properly to a DNS response that the system has sent with the "truncate" bit sent. In the DNS truncate sent field 618, network monitor 102 tracks how many responses have been sent with the truncate bit set, which allows it to later set host handles DNS truncate field 614 based on the subsequent behavior of the host. The DNS truncate sent field 618 is set to a value that is incremented when a DNS response is generated with the truncate bit set.

Host follows DNS CNAME field 616 can hold the values of (yes, no, unknown) to track whether the host has responded properly to a DNS response that the system has sent with a "CNAME" response. The DNS CNAME sent field 620 tracks how many responses have been sent with a CNAME, which allows it to later set host follows DNS CNAME field 616 based on the subsequent behavior of the host. The DNS CNAME sent field 620 is set to a value that is incremented when a DNS response is generated with a CNAME. The TCP minimum window size 622 controls the minimum TCP window size that a randomization function may select for TCP connections from the host.

Host techniques list 624 contains the list of tarpitting techniques that may be considered for flows to the host. This initially contains all techniques but may be restricted by certain analyses as explained below.

The fields shown for host record 600 are non-exhaustive, and shown for illustrative purposes only for illustrating some example functions performed. For example, if the host record 600 that was found has a host handles DNS truncate field 614 that is set to "yes", then a DNS response can be sent with a "truncate" bit set. If the host handles DNS truncate field 614 field is set to "unknown" and the DNS truncate sent field 618 is set to a value that is below a first threshold value, then a DNS response can be sent with the truncate bit set. If the DNS truncate sent field 618 is above a second threshold value (wherein the first and second thresholds can be same or can be different), then the host handles DNS truncate field 614 can be set to "no".

If a DNS response is generated with the truncate bit set, then host record's DNS truncate sent field 618 is incremented. An interval of time TI is selected in which to send a packet with the DNS response, wherein TI may be a preconfigured time interval or may be randomly selected in accordance with a randomization function. The associated flow record's timestamp 520 is set to be TI milliseconds in the future.

Listed now are some non-exhaustive example tarpitting techniques that can be selected for application to a received packet (e.g., that includes a malicious request) from a host, wherein the request belongs to a flow designated for tarpitting. Some example methods for applying a randomization function to the tarpitting techniques are also described. In one or more embodiments, the tarpitting techniques can include responding to the received packet with a response that is delayed by a selected delay interval. The length of the delay can be selected using the randomization function. In one or more embodiments, the tarpitting techniques can include responding to the received packet with a selected error message. The error message can be selected from a plurality of candidate error messages using the randomization function.

In one or more embodiments, the tarpitting technique(s) can include, wherein when a packet of the packets received uses transmission control protocol (TCP), responding to the received packet with numerous responses each having a small portion of the full response, responding to the received packet with a message having a bad TCP checksum, setting a TCP window size to a selected small value; and/or responding to the received packet with a message that does not include acknowledgement data. In addition to randomly selecting one of these tarpitting techniques, the division of the response into numerous responses and/or the small value can be selected using the randomization function.

In one nor more embodiments, the tarpitting technique(s) can include responding with a malformed response, such as by omitting or corrupting a selected portion of the response. The randomization function is used to determine at least one of which type of malformed response of a plurality of candidate types of malformed responses is used as the malformed response; which field(s) of a plurality of candidate fields in the malformed response to deform by e.g., changing, adding, or omitting data; which portion of the field determined to be malformed is to be deformed (e.g., offset from the start of the field and size); and how the randomization is applied to the field; a type of deformation to apply to the response; an amount of malformed responses to transmit; and a corrupted value to include in the malformed response.

For example, in one or more embodiments, when a packet of the packets received uses domain name system (DNS) and the received packet is a query that uses user datagram protocol (UDP), the tarpitting technique(s) can include responding to the received packet with an invalid opcode. The value to set in the opcode field can be selected using the randomization function.

In one or more embodiments, when a packet of the packets received uses a protocol with an authorization component, the tarpitting technique(s) can include responding to the received packet with a message that authorization is required or failed. A selection of whether to respond that the authorization is required or has failed can be selected using the randomization function.

In one or more embodiments, when a packet of the packets received uses hypertext transport protocol (HTTP), the tarpitting technique(s) can include responding to the received packet with an error code or a success code and a page body with a relatively large content-length; responding to the received packet with an error code or a success code and a page body without a content-length such that such page is of an indefinite size; and/or responding to the received packet with a page body containing a JavaScript link to a JavaScript resource, wherein the JavaScript link or JavaScript resource uses one or more available tarpitting techniques. In addition to randomly selecting one of these tarpitting techniques, the size of the large content-length, or whether to respond with an error or a success code can be selected using the randomization function.

In one or more embodiments, when a packet of the packets received uses DNS, the tarpitting technique(s) can include responding to the received packet with a delegation to a name server address that is null-routed, also known as having a "black hole route," meaning that any traffic sent to that address is silently dropped. When the host tries to query that address, it will not receive a response and will timeout. A chain depth for providing canonical names or redirections can be selected using the randomization function.

In one or more embodiments, when a packet of the packets received uses DNS, the tarpitting technique(s) can include responding to the received packet with an answer including a CNAME, and including an additional "A" record with an address that is null-routed.

In one or more embodiments, when a packet of the packets received uses DNS, the tarpitting technique(s) can include responding to the received packet with an answer including a delegation or CNAME as described above, but without an "A" record providing a response, and instead only including a different name. When the client requests resolution of that name, the tarpit system responds with another delegation or CNAME that also contains no "A" record, and only a different name. These responses may be "chained" together to an arbitrary length, creating a "delegation chain" or "CNAME chain".

Behavior of a host can be tracked using the host record 600 for determining whether the host is compliant with specification of a protocol being used. For example and without limitation, some behaviors that can be useful to track include tracking whether: a DNS client follows a CNAME redirect, a DNS client transmits a TCP request following a "truncation" response, a DNS client performs retries in response to an error reply, a TCP client performs retries in response to an error reply, an HTTP or SIP client follows a redirection request, an HTTP client requests a JavaScript resource in response to a reply that includes a page having a link to a JavaScript resource, the maximum inter-packet delay that still elicits a response from a host. It should be noted that fields may be added to the host record 600 for tracking all of these and similar behaviors.

When it is determined by analyzing the host record associated with a particular host that the host is not taking the bait for a tarpitting trap, a change in strategy is warranted to avoid expending resources continuing to attempt to bait that host. The change can include discontinuing or changing the tarpitting techniques and/or adjusting application of the randomization function based on the observed behavior. For example, when analysis of the host record reveals that the host does not maintain a TCP connection from network monitor 102 when the TCP window is set below a certain threshold size, TCP minimum window size 622 can be set to indicate that the randomization function should not select TCP window sizes below that value. Further, if analysis of the TCP minimum window size 622 reveals that the discovered minimum size is not small enough to result in effective tarpitting, then the TCP window size technique can be removed from host techniques list 624.

Figure 7:
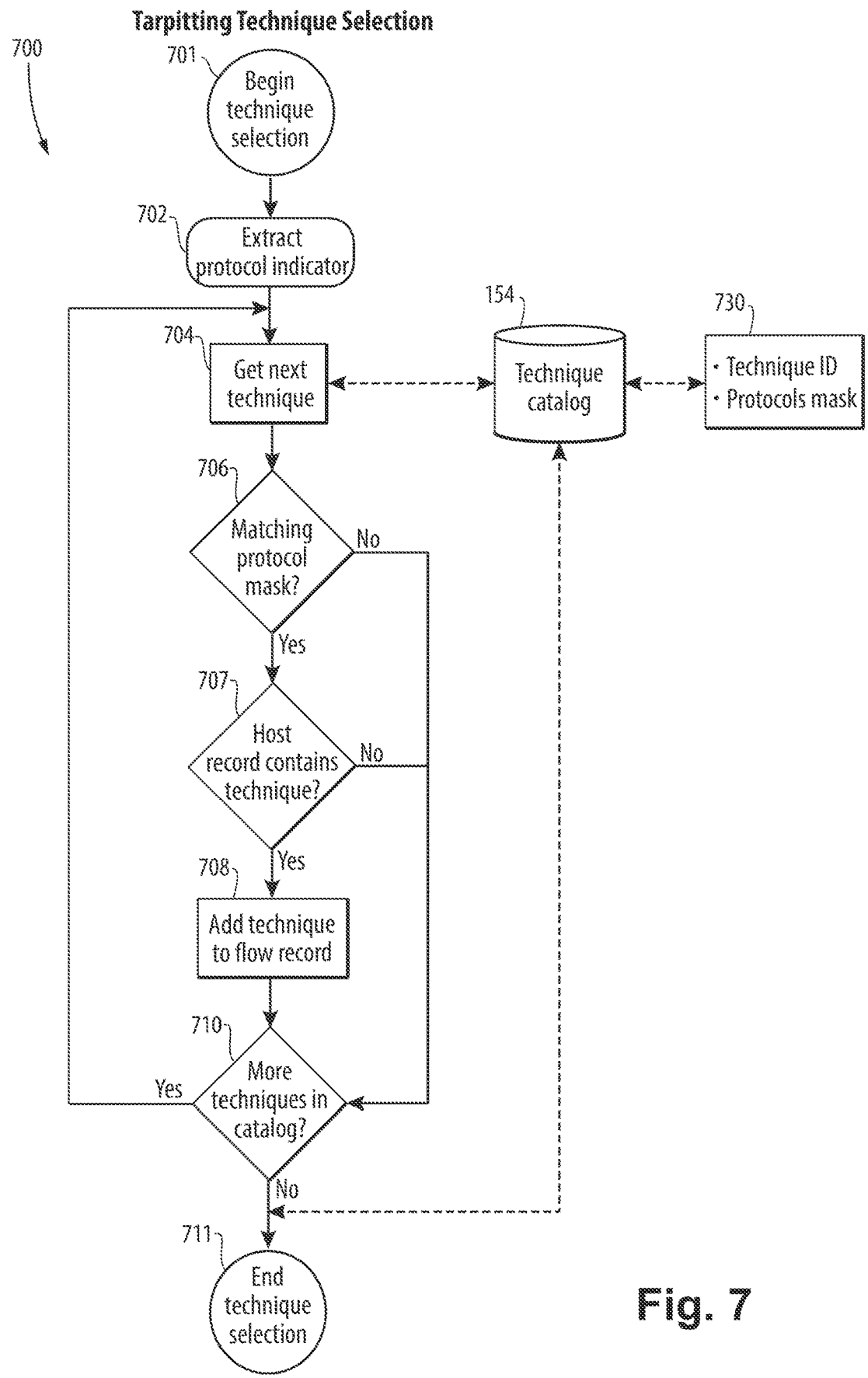
FIG. 7 illustrates a flowchart showing a further example method of selecting candidate tarpitting techniques to associate with a flow record, in accordance with one or more embodiments of the disclosure.

FIG. 7 shows a flowchart 700 of example operations performed by an example tarpit processor, such as tarpit processor 144 of network monitor 102 shown in FIG. 1, for selecting candidate tarpitting techniques to associate with a flow record to which a packet received from a host is assigned. The host is also referred to as the source of the packet received or packet source. The method of selecting the candidate tarpitting techniques begins at block 701. At block 702, a protocol indicator, such as protocol indicator 512 shown in FIG. 5, is extracted from the flow record. The protocol indicator indicates a protocol used by the flow record. At block 704, a technique catalog storing multiple tarpitting techniques, such as technique catalog 154 shown in FIG. 1, is accessed. The first technique in the technique catalog is accessed the first time that block 704 is executed. At block 706, a determination is made whether a protocol mask associated with the accessed technique includes the protocol indicated by the protocol indicator. If the determination at block 706 is NO, meaning the protocol mask does not include the protocol indicated by the protocol indicate for the tarpitting technique accessed, then the method continues at block 710. If the determination at block 706 is YES, meaning the protocol mask does include the protocol indicated by the protocol indicate for the tarpitting technique accessed, then the method continues at block 707. At block 707, the flow record's pointer to host record 502 is used to retrieve the host record 600 for the host associated with the packet, and a determination is made whether the accessed technique is in the list in the host record's host techniques list 624. If the determination at block 707 is YES, meaning the accessed technique is in the host's list of usable techniques, then processing continues at block 708 followed by block 710. If the determination at block 707 is NO, meaning the accessed technique is not present in the host's list of usable techniques, then processing continues at block 710.

At block 708, the technique accessed in the technique catalog is added to the flow record as a candidate technique. At block 710, a determination is made whether there are more techniques in the technique catalog to evaluate. If the determination at block 710 is NO, meaning there are no further techniques in the technique catalog to evaluate, then the method ends at block 711. If the determination at block 710 is YES, meaning there are more techniques in the technique catalog to evaluate, then the method returns to block 704 for accessing the next tarpitting technique in the technique catalog. A loop including blocks 704, 706, 708, and 710 are repeated until the method ends at block 711.

With additional reference to FIGS. 1 and 5, in one or more embodiments, the tarpitting techniques are selected and/or modified for a flow record by randomization engine 146. Randomization engine 146 applies a randomization function for generating a random output. The random output can be used to adjust a parameter of the at least one tarpitting technique selected to be applied or to select the tarpitting technique to be applied from the flow record's technique list 514. For example, a technique list for flow records 500 having a protocol indicator 512 that identifies a particular protocol may include five tarpitting techniques identified as T1, T2, T3, T4, and T5.

Each time tarpitting is applied for a different flow record 500 having a protocol identifier 512 that identifies the particular protocol, a different ordered selection of one or more techniques from the flow record 500's technique list 514 can be formed based on the random function. Techniques included in the technique list can be included in the ordered selection more than once or not at all. The selected tarpitting techniques are then applied based on the selection order. Some examples of ordered technique selections from the technique list 514 having tarpitting techniques T1, T2, T3, T4, and T5 include: [T3]; [T3, T4, T5]; [T4, T5, T3]; [T4, T3, T5, T4, T3]; and [T1, T1, T5, T1, T2, T1, T3, T4]. The ordered technique selections can have different lengths, combinations of techniques, and orders. Due to application of the random function for selecting the ordered technique selection, the client will be unable to predict which technique is being applied or which technique will be applied next.

Technique catalog 154 includes at least two different tarpitting techniques. Some tarpitting techniques that can be included in the technique catalog 154 and have protocol masks that include any protocol include, for example, responding to a received packet with a response that is delayed by a selected delay interval and/or responding to the received packet with a selected error message. In one or more embodiments, the parameter adjusted using randomization can be, for example, the selected delay interval or which error message (selected from a predetermined collection of error messages) is sent. When selecting the delay interval, the delays are kept short enough in order that the client would not timeout and send its request again.

Some tarpitting techniques that can be included in the technique catalog 154 and have protocol masks that include transmission control protocol (TCP) include, for example, responding to the received packet with numerous responses that each have a payload containing a small portion of the full response, responding to the received packet with a message having a bad TCP checksum, setting a TCP window size to a selected small value that is inadequate for the client to send a full reply to the response, and/or responding to the received packet with a message that does not include acknowledgement data. In one or more embodiments, the parameter adjusted using randomization can be, for example, a number of bytes and/or a selection of bytes to be included in the small portion. In one or more embodiments, the parameter adjusted using randomization can be, for example, the TCP window size.

Some tarpitting techniques that can be included in the technique catalog 154 and have protocol masks that use domain name system (DNS) and user datagram protocol (UDP) include, for example, responding to the received packet with a response truncated (TC) bit set, wherein the response truncated bit is a specific bit that can be set in a DNS response to indicate that the response has been truncated, and which is intended in this situation to trigger a specific client behavior.

A tarpitting technique that can be included in the technique catalog 154 and has a protocol mask that uses a protocol with an authorization component includes, for example, responding to the received packet with a message that authorization is required or failed. In one or more embodiments, the parameter adjusted using randomization can be, for example, whether the message is that the authorization is required or failed.

A tarpitting technique that can be included in the technique catalog 154 and has a protocol mask that uses hypertext transport protocol (HTTP) includes, for example, responding to the received packet with an error code or a success code, e.g., with a "Content-Length" HTTP header that creates an expectation of a relatively large page body. In this context "relatively large" means a size such that the system can manipulate the client to download slowly enough to keep that client busy with this request for as long as possible, anywhere from several seconds to several hours. When the page body is not advertised with any size, it can be offered as an indefinitely-sized download by failing to provide a "Content-Length" HTTP header. In one or more embodiments, the parameter adjusted using randomization can be, for example, whether the page size is advertised and the page size that is advertised. In another example, the tarpitting technique for use with HTTP can include responding to the received packet with a JavaScript™ link to a JavaScript resource, wherein the JavaScript link or JavaScript resource use a tarpitting technique. In one or more embodiments, the parameter adjusted using randomization can be, for example, a page size of a page including the JavaScript link and/or selection of the tarpitting technique used by the JavaScript link or JavaScript resource.

Figure 8:
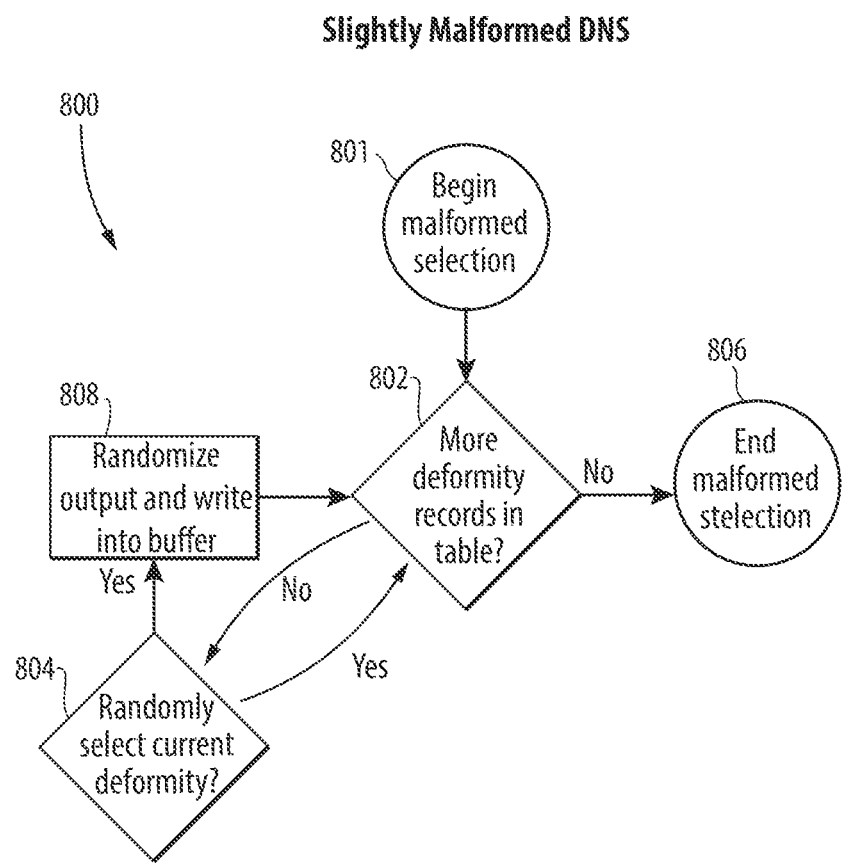
FIG. 8 illustrates a flowchart showing an example method of selecting one or more tarpitting techniques to cause a response to a client to be malformed, in accordance with one or more embodiments of the disclosure.

FIG. 8 shows a flowchart 800 of example operations performed by an example tarpit processor, such as tarpit processor 144 of network monitor 102 shown in FIG. 1, for selecting one or more tarpitting techniques to cause a response to the client to be malformed. At block 801 a malformation selection is begun. At decision block 802, a deformity DB 158, containing records (such as deformity record 1300 shown in FIG. 13) is accessed, and a determination is made if there are more deformity records to be accessed.

Figure 13:
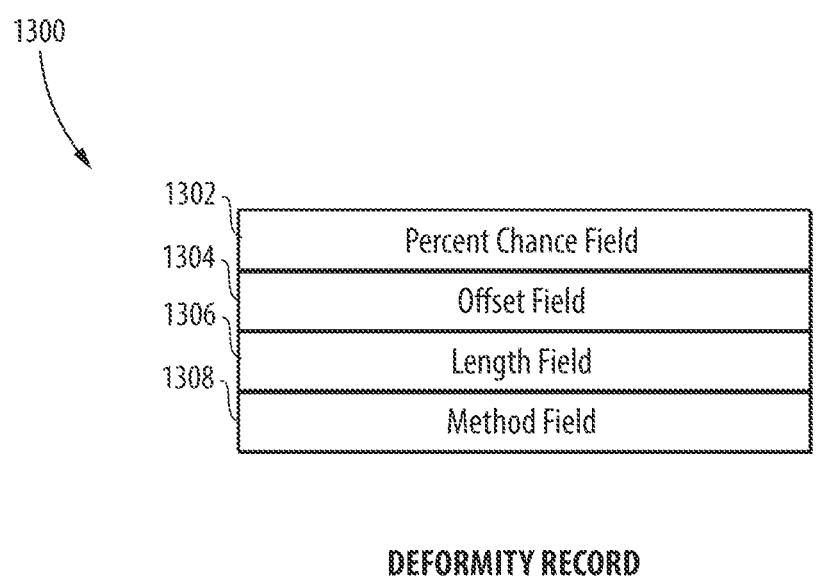
FIG. 13 illustrates an example deformity record, which is used to control the randomization of certain fields of a packet to be sent by the system to a host.

With additional reference to FIG. 13, a database containing deformity records 1300 can be integrated with or accessible to network monitor 102, for example as via deformity DB 158, which can store one or more deformity tables. Each deformity record of deformity DB 158 includes one or more fields that can be used to randomly select a deformity being applied. Example fields include a percent chance field 1302, an offset field 1304, a length field 1306, and a method field 1308. Example methods of applying these fields are described with respect to FIG. 8.

If the determination at decision block 802 is that NO, there are no more deformity records to be accessed, the method ends at block 806. If the determination at decision block 802 is that YES, there are more deformity records to be accessed, the method continues at decision block 804.

At decision block 804, a determination is made whether the deformity to be applied should be randomly selected. This determination is made by generating a random integer between 0 and 100 using the randomization function, and comparing that value to a value stored in a percent chance field of the deformity record. If the random value is higher than the percent chance 1302 then the determination at decision block 804 is NO, the deformity should not be randomly selected, the method advances to the next deformity record in the table and returns to decision block 802. If the random value is less than or equal to the percent chance 1302 then the determination at decision block 804 is that YES, the deformity should be randomly selected, the method continues at block 808. The value in the percent chance field therefore determines the probability of randomization. At block 808, a randomization function is applied for generating randomized output, using the fields in the deformity table record to select values in different fields of the output, such as offset field 1304, length field 1306, and method field 1308. The randomization function will then overwrite the output, starting at the offset specified by the selected deformity record's offset field 1304 and overwriting a length of bits specified by the selected deformity record's length field 1306. The value to be overwritten to that location is generated by selecting a random value according to the selected deformity record's method field 1308, where the method field may include, but is not limited to, such methods as: generating an integer within a range, generating a random string where the letters of the string are from a specified alphabet, or selecting a value from a specified set of predetermined possible values such as DNS opcodes or HTTP status values. The randomized output is written to a buffer, such as pending packet buffer 508. The randomized output can remain in the pending packet buffer 508 until flow record processing is performed at block 212. The flow record processing can include outputting data sitting in the pending packet buffer 508.

Figure 9:
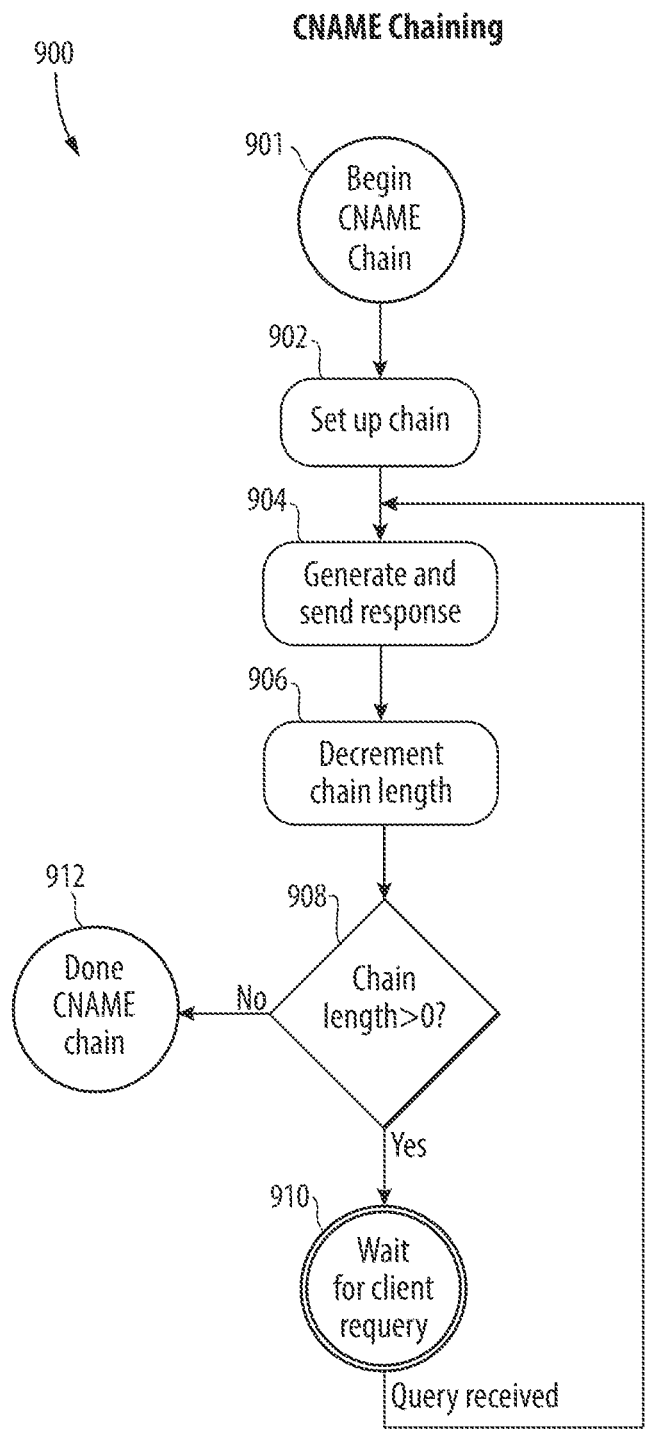
FIG. 9 illustrates a flowchart showing an example method of performing a tarpitting technique that uses CNAME chaining, in accordance with one or more embodiments of the disclosure.

FIG. 9 shows a flowchart 900 of example operations performed by an example tarpit processor, such as tarpit processor 144 of network monitor 102 shown in FIG. 1, for performing a tarpitting technique that uses CNAME chaining with a flow that has a protocol indicator 512 set to DNS. At block 901 a CNAME chain process is begun. At block 902 the chain is set up. The chain is set up with a selected chain length. The chain length can be selected by applying a randomization function.

At block 904 a response is generated and sent. At block 906 a length of the chain is decremented. At decision block 908 a determination is made whether the chain length is greater than zero. If the determination at block 908 is that NO, the chain length is not greater than zero (meaning the chain has been depleted), the method ends at block 912. If the determination at block 908 is that YES, the chain length is still greater than zero, the method continues at block 910 in which a wait state is entered until a client re-query is received, after which the method continues at block 902.

Figure 10:
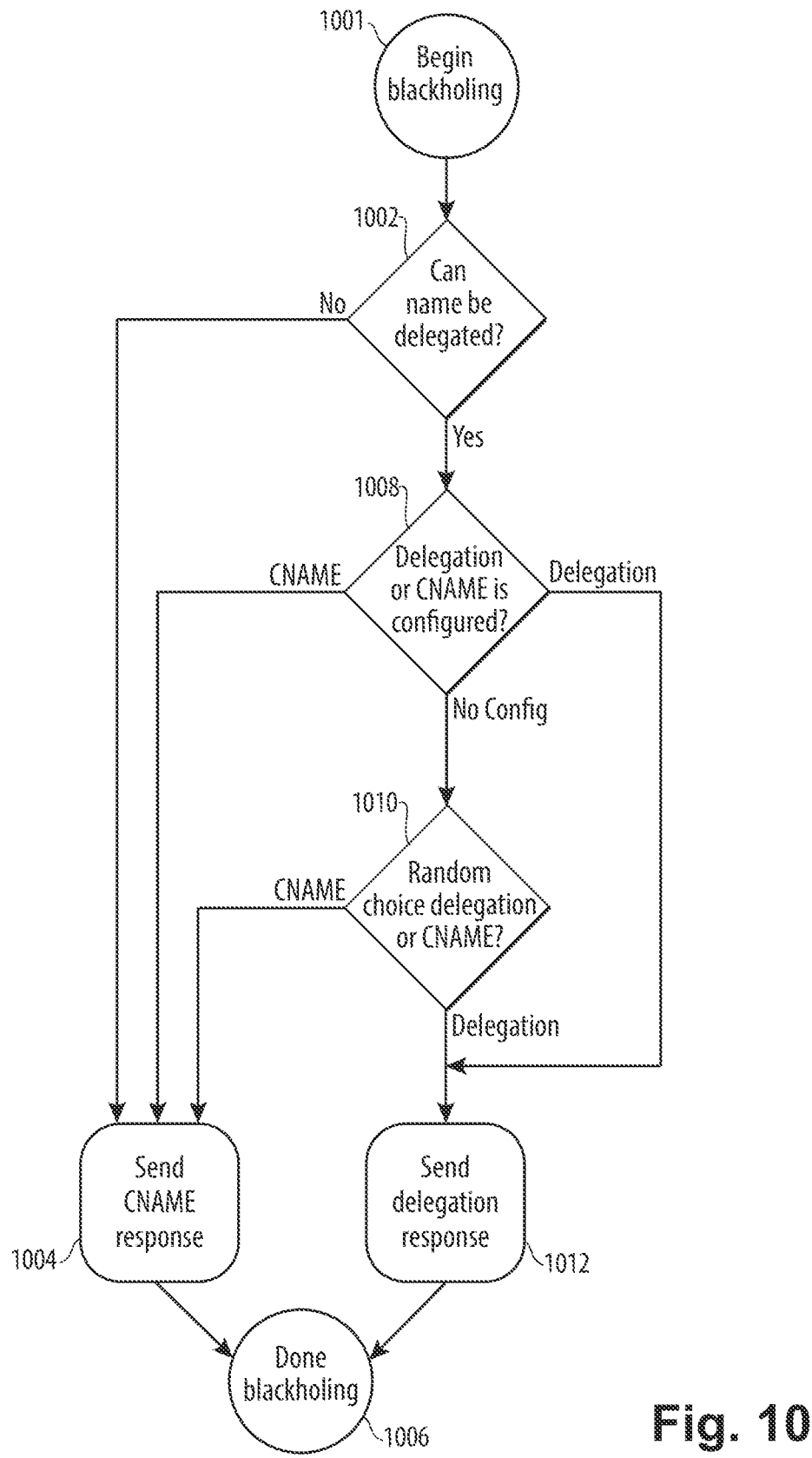
FIG. 10 illustrates a flowchart showing an example method of performing a tarpitting technique that uses delegation or CNAME blackholing in accordance with one or more embodiments of the disclosure.

FIG. 10 shows a flowchart 1000 of example operations performed by an example tarpit processor, such as tarpit processor 144 of network monitor 102 shown in FIG. 1, for performing a tarpitting technique that uses that uses delegation or CNAME blackholing with a flow that has a protocol indicator 512 set to DNS. At block 1001 a blackholing process is begun. At decision block 1002, a determination is made whether the name contained in the DNS query of the current packet of the current flow can be delegated. If the determination at decision block 1002 is that NO, the name cannot be delegated, the method continues at block 1004. At block 1004 a CNAME response is sent with the name that was accessed, followed by block 1006, at which the method ends. If the determination at decision block 1002 is that YES, the name can be delegated, the method continues at decision block 1008. At decision block 1008 a determination is made whether the delegation of CNAME is configured. If the determination at decision block 1008 is that no configuration is provided, the method continues at random selection block 1010.

At random selection block 1010, a random function is applied to choose delegation or CNAME. If the determination at decision block 1008 or the selection at random selection block 1010 is CNAME, the method continues at block 1004 for sending the CNAME response (after which the method ends at block 1006). If the determination at decision block 1008 or the selection at random selection block 1010 is delegation, the method continues at block 1012. At block 1012 a delegation response is sent, after which the method ends at block 1006.

Figure 11:
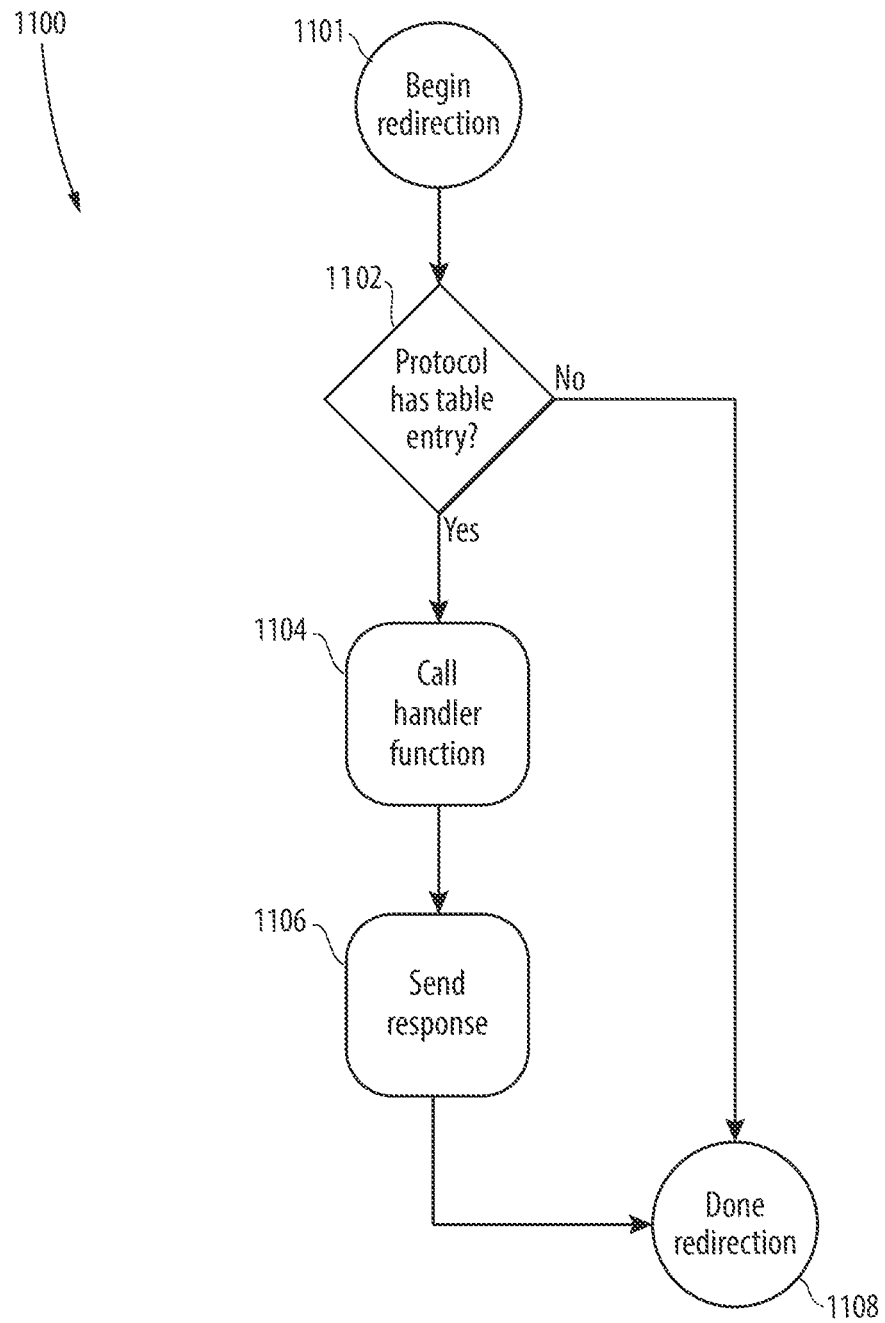
FIG. 11 illustrates a flowchart showing an example method of performing a tarpitting technique that uses application-layer redirection into a tarpit, in accordance with one or more embodiments of the disclosure.

FIG. 11 shows a flowchart 1100 of example operations performed by an example tarpit processor, such as tarpit processor 144 of network monitor 102 shown in FIG. 1, for performing a tarpitting technique that uses that uses an application-layer redirection into a tarpit. At block 1101 a redirection process is begun for a flow that has an associated flow record 500. At decision block 1102, a determination is made whether the protocol indicator 512 of the flow record is a protocol that supports redirection. This determination may be made by comparing the protocol to a list of handler functions that the redirection process contains. If the determination at decision block 1102 is that NO, there is not a handler function for redirection, the method ends at block 1108. If the determination at decision block 1102 is that YES, there is a handler function for redirection, the method continues at block 1104. At block 1104 a process, such as a handler function, is called to perform a redirection process. The handler function's process varies from protocol to protocol, but as an example, for HTTP, this can consist of preparing a response containing a 301, 302, or similar status code with a "Location" header that specifies the target of the redirection. At block 1106, the response prepared by the handler function is sent, after which the method ends at block 1108.

The redirection process may be randomized in various ways. The following is a non-exhaustive list of examples of how redirection can be randomized: the choice of status code (for HTTP, this includes 301, 302, etc.) may be generated by a randomization function; if the location of the redirection is to a DNS name, the DNS name of the redirection may be a randomly-generated DNS name in a domain that is controlled by the tarpit system; if the location of the redirection is to an IP address, the IP address of the redirection may be within a range of addresses controlled by the tarpit system; if the location of the redirection includes an application port (for example, a TCP or UDP port) then the port may be randomly chosen from a list of valid ports; at step 1206 the response may be sent after a randomly selected time delay; at step 1204 the handler could be skipped in some proportion of invocations where the decision to skip redirection is based on a random selection.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of network monitor 102 (including packet processor 142 and tarpit processor 144) may be implemented or executed by one or more computer systems. For example, network monitor 102 can be implemented using a computer system such as example computer system 1200 illustrated in FIG. 12. In various embodiments, computer system 1200 may be a server, a mainframe computer system, a workstation, a network computer, a desktop computer, a laptop, or the like, and/or include one or more of a field-programmable gate array (FPGA), application specific integrated circuit (ASIC), microcontroller, microprocessor, or the like.

Computer system 1200 is only one example of a suitable system and is not intended to suggest any limitation as to the scope of use or functionality of embodiments of the disclosure described herein. Regardless, computer system 1200 is capable of being implemented and/or performing any of the functionality set forth hereinabove.

Computer system 1200 may be described in the general context of computer system-executable instructions, such as program modules, being executed by a computer system. Generally, program modules may include routines, programs, objects having data and/or functions that can be invoked by data values, classes (wherein the objects (as an instance of a class) and classes form a virtual machine), virtual components, logic, data structures, and so on that perform particular tasks or implement particular abstract data types. Computer system 1200 may be practiced in distributed data processing environments where tasks are performed by remote processing devices that are linked through a communications network. In a distributed data processing environment, program modules may be located in both local and remote computer system storage media including memory storage devices.

Computer system 1200 is shown in FIG. 12 in the form of a general-purpose computing device. The components of computer system 1200 may include, but are not limited to, one or more processors or processing units 1216, a system memory 1228, and a bus 1218 that couples various system components including system memory 1228 to processor 1216.

Bus 1218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus or a virtual messaging link like MQ (Message Queuing)

Computer system 1200 typically includes a variety of computer system readable media. Such media may be any available media that is accessible by network monitor 102, and it can include both volatile and non-volatile media, removable and non-removable media.

System memory 1228 can include computer system readable media in the form of volatile memory, such as random access memory (RAM) 1230 and/or cache memory 1232. Computer system 1200 may further include or access other removable/non-removable, volatile/non-volatile computer system storage media. By way of example only, storage system 1234 can be provided for reading from and writing to a non-removable, non-volatile magnetic media (not shown and typically called a "hard drive"). Although not shown, a magnetic disk drive for reading from and writing to a removable, non-volatile magnetic disk, and an optical disk drive for reading from or writing to a removable, non-volatile optical disk such as a CD-ROM, DVD-ROM or other optical media can be provided. In such instances, each can be connected to bus 1218 by one or more data media interfaces. As will be further depicted and described below, memory 1228 may include at least one program product having a set (e.g., at least one) of program modules that are configured to carry out the functions of embodiments of the disclosure. In embodiments, flow record DB 150, host record DB 152, technique catalog 154, and/or flow record queue 156 shown in FIG. 1 may be included in memory 1228.

Program/utility 1240, having a set (at least one) of program modules 1215, such as packet processor 142 and tarpit processor 144, may be stored in memory 1228 by way of example, and not limitation, as well as an operating system, one or more application programs, other program modules, and program data. Each of the operating system, one or more application programs, other program modules, and program data or some combination thereof, may include an implementation of a networking environment. Program modules 1215 generally carry out the functions and/or methodologies of embodiments of the disclosure as described herein.

Computer system 1200 may also communicate with one or more external devices 1214 such as a keyboard, a pointing device, a display 1224, external storage devices, etc.; one or more devices that enable a user to interact with computer system 1200; and/or any devices (e.g., network card, modem, etc.) that enable computer system 1200 to communicate with one or more other computing devices. Such communication can occur via Input/Output (I/O) interfaces 1222. Still yet, computer system 1200 can communicate with one or more networks such as a local area network (LAN), a general wide area network (WAN), and/or a public network (e.g., the Internet) via network adapter 1220. As depicted, network adapter 1220 communicates with the other components of computer system 1200 via bus 1218. It should be understood that although not shown, other hardware and/or software components could be used in conjunction with computer system 1200. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Potential advantages provided by network monitor 102 include the ability to combine tarpitting techniques in order to make it harder for an attacker to realize that a defense mechanism is in place and/or to make it harder for the attacker to avoid countermeasures applied. An additional advantage is that the system can alternate between different techniques, both over time and for different attacker source IP addresses, which also presents the same challenges to an attacker. By keeping statistics for each host in the Host Record 700, the system can ensure that it is using the technique or techniques that are most effective against a particular attacker.

The techniques described herein are exemplary, and should not be construed as implying any particular limitation of the certain illustrated embodiments. It should be understood that various alternatives, combinations, and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations or components or groups thereof.

Although the systems and methods of the subject disclosure have been described with respect to the embodiments disclosed above, those skilled in the art will readily appreciate that changes and modifications may be made thereto without departing from the spirit and scope of the certain illustrated embodiments as defined by the appended claims.

What is claimed is:

1. A method of monitoring a network during a DDOS attack, the method comprising:
   receiving packets included in the attack;
   determining whether the packets are designated for tarpitting;
   for each packet from a source determined to be designated for tarpitting, assigning the packet to an existing or newly established flow;
   applying at least one tarpitting technique;
   applying a randomization function for adjusting the at least one tarpitting technique or for selecting the at least one tarpitting technique to be applied from a plurality of candidate tarpitting techniques;
   observing behavior of the source based on a response from the source, content of the response from the source, and/or lack of response by the source to the at least one tarpitting technique used, and adjusting application of the randomization function based on the observed behavior; and
   for each newly established flow, establishing a flow record, wherein the flow record stores one or more parameters that affect timing and/or content of a transmission and/or a future transmission related to the flow, wherein applying the at least one tarpitting technique includes adjusting at least one of the parameters stored with the flow record and delay of transmission.

2. The method of claim 1, wherein applying the at least one tarpitting technique includes at least one of transmitting the transmission, enqueuing the transmission, and modifying one or more fields of the flow record for the future transmission, and updating counters and/or statistics that affect the future transmission.

3. The method of claim 1, wherein the one or more parameters include a timestamp value, wherein the timestamp value indicates a time when the transmission or the future transmission should be sent.

4. The method of claim 3, wherein sending of the transmission or the future transmission is caused to be performed in response to a timer having a time that matches the timestamp value or receipt of a packet of the flow.

5. The method of claim 1, wherein adjustment of the parameter causes delay of the transmission when sent in response to receipt of a packet, wherein the parameter is adjusted for the delay to be less than a value that would trigger a client timeout.

6. The method of claim 1, wherein the flow record includes a protocol indicator indicative of a protocol used by the flow, and the candidate tarpitting techniques are selected from a catalogue of multiple tarpitting techniques, each of the multiple tarpitting techniques having a protocol mask indicative of a protocol to which the tarpitting technique is suitable to be applied, wherein the candidate tarpitting techniques selected from the catalogue each have a protocol indicator that matches the protocol mask of the flow record.

7. The method of claim 1,
   wherein the at least one tarpitting technique includes one or more of the following tarpitting technique sets:
   A. responding to the received packet with a response that is delayed by a selected delay interval;
   B. responding to the received packet with a selected error message;
   C. responding to the received packet with a malformed response in which a portion of a proper response is omitted, corrupted or has been added to;
   D. wherein when a packet of the packets received uses transmission control protocol (TCP):
       responding to the received packet with numerous responses each having a small portion of a full response;
       responding to the received packet with a message having a bad TCP checksum;
       setting a TCP window size to a selected small value; and/or
       responding to the received packet with a message that does not include acknowledgement data;
   E. wherein when a packet of the packets received uses domain name system (DNS) and the received packet is a query that uses user datagram protocol (UDP), responding to the received packet with a truncated response;
   F. wherein when a packet of the packets received uses a protocol with an authorization component, responding to the received packet with a message that authorization is required or failed;
   G. wherein when a packet of the packets received uses hypertext transport protocol (HTTP):
       responding to the received packet with an error code or a success code and a page body with a relatively large content-length;
       responding to the received packet with an error code or a success code and a page body without a content-length header such that such page is of an indefinite size; and/or
       responding to the received packet with a page body containing a link to a JavaScript resource, wherein the JavaScript resource uses one or more available tarpitting techniques;
   H. wherein when a packet of the packets received uses DNS, responding to the received packet with a delegation response chain or a CNAME response chain to a name server address that is null-routed; and I. wherein when a packet of the packets received uses a protocol that supports a redirection feature, responding to the received packet with an application redirection for redirecting a client into a tarpit.

8. The method of claim 7, wherein the randomization function adjusts the at least one tarpitting technique, including at least one of:

for tarpitting technique set A, setting a length of the selected delay interval based on a value determined by the randomization function;

for tarpitting technique set B, selecting the error message from a plurality of candidate error messages using the randomization function;

for tarpitting technique set C, wherein the randomization function is used to determine at least one of:
which type of malformed response of a plurality of candidate types of malformed responses is used as the malformed response;
which field of a plurality of candidate fields in the malformed response to deform, add, or omit;
a portion of the field determined to be malformed;
a type of deformation to apply to the response;
an amount of malformed responses to transmit; and
a value to include in the malformed response;

for tarpitting technique set D, wherein the randomization function is used to determine at least one of a type of tarpitting techniques to apply, a division of the response into numerous responses, and/or the small value;

for tarpitting technique set E, setting an amount of the response that is truncated based on a value determined by the randomization function;

for tarpitting technique set F, whether to respond that the authorization is required or has failed is determined using the randomization function;

for tarpitting technique set G, wherein the randomization function is used to determine at least one of a type of tarpitting techniques to apply, a size of the large content-length, whether to respond with an error or a success code is determined using the randomization function;

for tarpitting technique set H, wherein a chain length for providing canonical names or delegation is selected using the randomization function, and/or wherein a selection of sending a CNAME response or a delegation response is made by applying a randomization process; and for tarpitting technique set I, wherein the randomization function is used to determine at least one of a redirection message or code, and/or a redirection location which may include a random value for the name and/or address of the location, and/or a random value for a TCP or UDP port of the location.

9. A network monitor for monitoring a network during a DDOS attack, the network monitor comprising:
a memory configured to store instructions;
at least one processing device disposed at a location and in communication with the memory, wherein the at least one processing device upon execution of the instructions is configured to:
receive packets included in the attack;
determine whether the packets are designated for tarpitting;
for each packet from a source determined to be designated for tarpitting, assign the packet to an existing or newly established flow;
apply at least one tarpitting technique;
apply a randomization function for adjusting the at least one tarpitting technique or for selecting the at least one tarpitting technique to be applied from a plurality of candidate tarpitting techniques;
observe behavior of the source based on a response from the source, content of the response from the source, and/or lack of response by the source to the at least one tarpitting technique used, and adjusting application of the randomization function based on the observed behavior; and
for each newly established flow, establish a flow record, wherein the flow record stores one or more parameters that affect timing and/or content of a transmission and/or a future transmission related to the flow, wherein applying the at least one tarpitting technique includes adjusting at least one of the parameters stored with the flow record and delay of transmission.

10. The network monitor of claim 9, wherein applying the at least one tarpitting technique includes at least one of transmitting the transmission, enqueuing the transmission, and modifying one or more fields of the flow record for the future transmission, and updating counters and/or statistics that affect the future transmission.

11. The network monitor of claim 9, wherein the one or more parameters include a timestamp value, wherein the timestamp value indicates a time when the transmission or the future transmission should be sent.

12. The network monitor of claim 11, wherein sending of the transmission or the future transmission is caused to be performed in response to a timer having a time that matches the timestamp value or receipt of a packet of the flow.

13. The network monitor of claim 9, wherein adjustment of the parameter causes delay of the transmission when sent in response to receipt of a packet, wherein the parameter is adjusted for the delay to be less than a value that would trigger a client timeout.

14. The network monitor of claim 9, wherein the flow record includes a protocol indicator indicative of a protocol used by the flow, and the candidate tarpitting techniques are selected from a catalogue of multiple tarpitting techniques, each of the multiple tarpitting techniques having a protocol mask indicative of a protocol to which the tarpitting technique is suitable to be applied, wherein the candidate tarpitting techniques selected from the catalogue each have a protocol indicator that matches the protocol mask of the flow record.

15. The network monitor of claim 9,
wherein the at least one tarpitting technique includes one or more of the following tarpitting technique sets:
A. responding to the received packet with a response that is delayed by a selected delay interval;
B. responding to the received packet with a selected error message;
C. responding to the received packet with a malformed response in which a portion of a proper response is omitted, corrupted or has been added to;
D. wherein when a packet of the packets received uses transmission control protocol (TCP):
responding to the received packet with numerous responses each having a small portion of a full response;
responding to the received packet with a message having a bad TCP checksum;
setting a TCP window size to a selected small value; and/or responding to the received packet with a message that does not include acknowledgement data;

E. wherein when a packet of the packets received uses domain name system (DNS) and the received packet is a query that uses user datagram protocol (UDP), responding to the received packet with a truncated response;

F. wherein when a packet of the packets received uses a protocol with an authorization component, responding to the received packet with a message that authorization is required or failed;

G. wherein when a packet of the packets received uses hypertext transport protocol (HTTP):
   responding to the received packet with an error code or a success code and a page body with a relatively large content-length;
   responding to the received packet with an error code or a success code and a page body without a content-length header such that such page is of an indefinite size; and/or
   responding to the received packet with a page body containing a link to a JavaScript resource, wherein the JavaScript resource uses one or more available tarpitting techniques;

H. wherein when a packet of the packets received uses DNS, responding to the received packet with a delegation response chain or a CNAME response chain to a name server address that is null-routed; and I. wherein when a packet of the packets received uses a protocol that supports a redirection feature, responding to the received packet with an application redirection for redirecting a client into a tarpit.

16. The network monitor of claim 15, wherein the randomization function adjusts the at least one tarpitting technique, including at least one of:
   for tarpitting technique set A, setting a length of the selected delay interval based on a value determined by the randomization function;
   for tarpitting technique set B, selecting the error message from a plurality of candidate error messages using the randomization function;
   for tarpitting technique set C, wherein the randomization function is used to determine at least one of:
      which type of malformed response of a plurality of candidate types of malformed responses is used as the malformed response;
      which field of a plurality of candidate fields in the malformed response to deform, add, or omit;
      a portion of the field determined to be malformed;
      a type of deformation to apply to the response;
      an amount of malformed responses to transmit; and
      a value to include in the malformed response;
   for tarpitting technique set D, wherein the randomization function is used to determine at least one of a type of tarpitting techniques to apply, a division of the response into numerous responses, and/or the small value;
   for tarpitting technique set E, setting an amount of the response that is truncated based on a value determined by the randomization function;
   for tarpitting technique set F, whether to respond that the authorization is required or has failed is determined using the randomization function;
   for tarpitting technique set G, wherein the randomization function is used to determine at least one of a type of tarpitting techniques to apply, a size of the large content-length, whether to respond with an error or a success code is determined using the randomization function;
   for tarpitting technique set H, wherein a chain length for providing canonical names or delegation is selected using the randomization function, and/or wherein a selection of sending a CNAME response or a delegation response is made by applying a randomization process; and
   for tarpitting technique set I, wherein the randomization function is used to determine at least one of a redirection message or code, and/or a redirection location which may include a random value for the name and/or address of the location, and/or a random value for a TCP or UDP port of the location.

* * * * *